US006775118B2

(12) United States Patent
Hinterscher et al.

(10) Patent No.: US 6,775,118 B2
(45) Date of Patent: Aug. 10, 2004

(54) SUPPLY VOLTAGE REFERENCE CIRCUIT

(75) Inventors: Eugene B. Hinterscher, McKinney, TX (US); Timothy A. Ten Eyck, Denison, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/273,778

(22) Filed: Oct. 18, 2002

(65) Prior Publication Data

US 2003/0030424 A1 Feb. 13, 2003

Related U.S. Application Data

(62) Division of application No. 09/638,326, filed on Aug. 14, 2000.

(51) Int. Cl.[7] .................................................. H02H 3/00

(52) U.S. Cl. .......................... 361/90; 361/91.1; 361/92; 361/115

(58) Field of Search ........................... 361/90, 92, 91.1, 361/115, 58, 18

(56) References Cited

U.S. PATENT DOCUMENTS

| | | | |
|---|---|---|---|
| 5,304,918 A | | 4/1994 | Khieu |
| 6,052,020 A | | 4/2000 | Doyle |
| 6,100,719 A | | 8/2000 | Graves et al. |
| 6,380,723 B1 | | 4/2002 | Sauer |
| 6,498,405 B1 | * | 12/2002 | Hinterscher et al. ........ 307/130 |

* cited by examiner

*Primary Examiner*—Stephen W. Jackson
(74) *Attorney, Agent, or Firm*—William B. Kempler; W. James Brady, III; Frederick J. Telecky, Jr.

(57) ABSTRACT

A supply reference voltage circuit is coupled to an output node, a supply voltage node and a supply reference voltage node and is operable to connect the output node to the supply reference voltage node and prevent current flow through an output device coupled to the output node in response to sensing a low voltage level at the supply voltage node and a non-zero voltage at the output node. The circuit is further operable to connect the supply reference voltage node to the supply voltage node in response to the voltage at the output node being a threshold voltage above the voltage at the supply voltage node. The circuit is further operable to bypass a blocking diode in response to sensing a high voltage level at the supply voltage node.

5 Claims, 1 Drawing Sheet

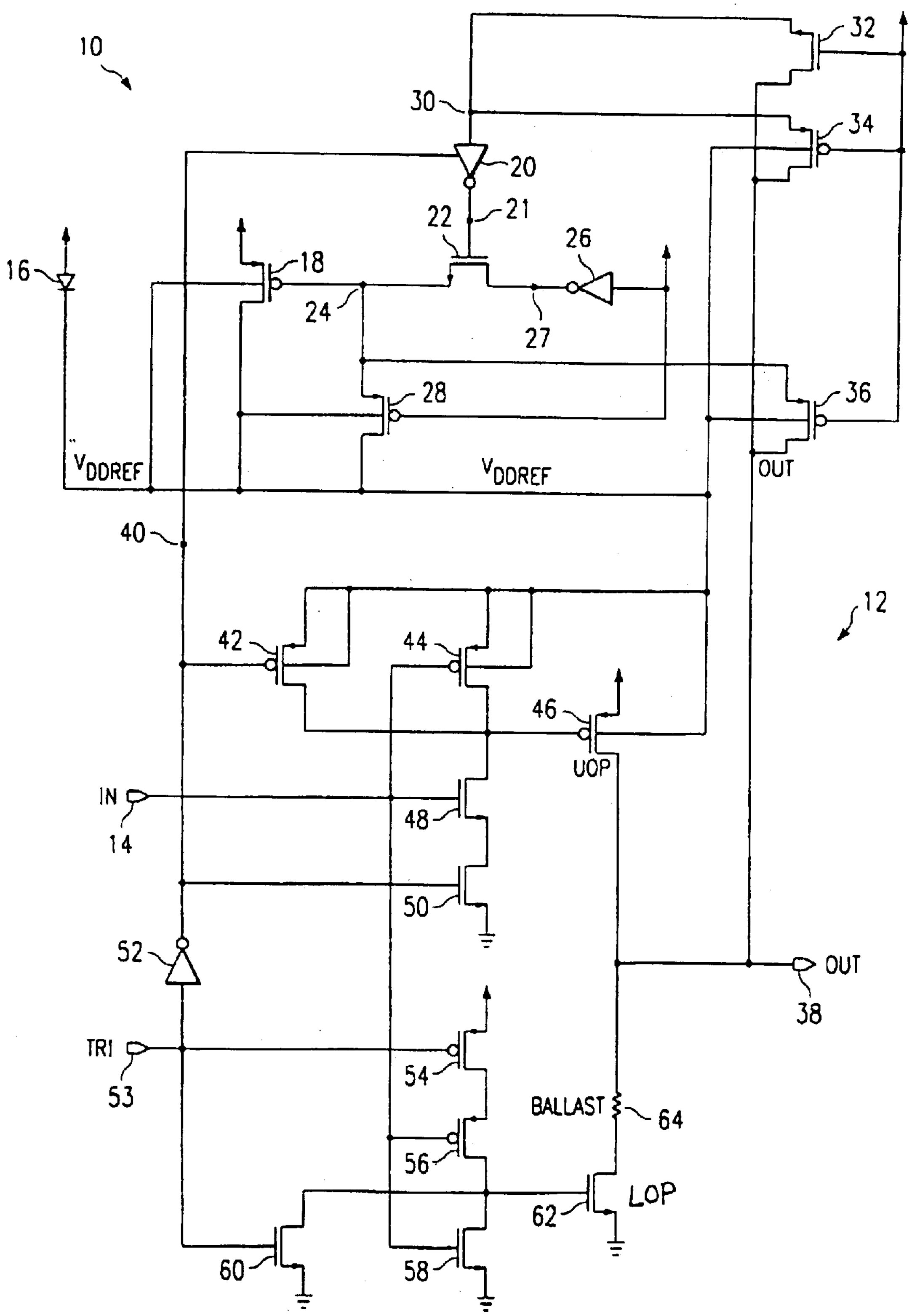
10
30
32
34
20
21
22
26
18
16
24
27
28
36
VDDREF
VDDREF
OUT
40
12
42
44
46
UOP
IN
14
48
50
52
OUT
38
TRI
53
54
BALLAST
64
56
62
LOP
60
58

SUPPLY VOLTAGE REFERENCE CIRCUIT

This application is a divisional of Ser. No. 09/638,326, filed Aug. 14, 2000 and claims priority of Provisional Application No. 60/151,244, filed Aug. 27, 1999.

TECHNICAL FIELD OF THE INVENTION

This invention is related in general to the field of electrical and electronic circuits, and more particularly, to a supply voltage reference circuit.

BACKGROUND OF THE INVENTION $V_{DD}$ reference circuits supply a reference voltage to other circuits in a system. A $V_{DD}$ reference circuit is sometimes required to be overvoltage tolerant and have minimum $I_{off}$ current. Overvoltage is a condition that occurs when the output pin of the $V_{DD}$ reference circuit is pulled a threshold voltage ($V_{DD}$) above the $V_{DD}$. $I_{off}$ refers to the maximum leakage current that flows into or out of the input or output nodes when the input or output is forced to a given DC voltage when $V_{DD}$ is zero. However, conventional $V_{DD}$ reference circuits, although satisfying these requirements, suffer from the disadvantage of always supplying a smaller $V_{DD}$ voltage during normal circuit operations. The decreased $V_{DD}$ is caused by the large voltage drop across the blocking diode. As the voltage level of $V_{DD}$ becomes smaller, the voltage drop across the blocking diode becomes a more significant factor leading to reduced speed of circuit devices. Conventional $V_{DD}$ reference circuits are also disadvantageous due to the use of a schottky diode that is typically coupled in parallel with the blocking diode. Schottky diodes are undesirable because they are typically leaky by nature.

SUMMARY OF THE INVENTION

It has been recognized that it is desirable to provide a supply reference voltage circuit that satisfies $I_{off}$ and overvoltage tolerance requirements, as well as bypasses the current blocking diode during normal operations.

In one aspect of the invention, a supply reference voltage circuit is coupled to an output node, a supply voltage node and a supply reference voltage node and is operable to connect the output node to the supply reference voltage node and prevent current flow through an output device coupled to the output node in response to sensing a low voltage level at the supply voltage node and a non-zero voltage at the output node. The circuit is further operable to connect the supply reference voltage node to the supply voltage node in response to the voltage at the output node being a threshold voltage above the voltage at the supply voltage node. The circuit is further operable to bypass a blocking diode in response to sensing a high voltage level at the supply voltage node.

In another aspect of the invention, a supply reference voltage circuit generates a stable supply reference voltage from a supply voltage. The circuit includes a blocking diode coupled between the supply voltage and the supply reference voltage, and an output node. The circuit further includes a first circuit coupled to the output node, the supply voltage and the supply reference voltage and operable to prevent current flow through an output device coupled to the output node in response to sensing a low supply voltage level and a non-zero output voltage level. The first circuit further operable to connect the output node to the supply reference voltage in response to the voltage at the output node being a threshold voltage above the supply voltage level. The circuit further includes a second circuit coupled to the supply voltage and the supply reference voltage operable to connect the supply reference voltage to the supply voltage and bypass the blocking diode in response to sensing a high supply voltage level.

In yet another aspect of the invention, a method of providing a supply reference voltage includes the steps of turning off an output transistor in response to sensing a non-zero voltage level at the output node and a zero supply voltage level, connecting the supply reference voltage to the voltage at an output node coupled to the output transistor in response to sensing the voltage at the output node being a threshold voltage above the supply voltage level, and also providing a path from a supply voltage to the supply reference voltage and thereby bypassing a current blocking diode coupled between the supply voltage and the supply reference voltage.

One technical advantage of the invention is the reduction of $I_{off}$, satisfying overvoltage tolerance requirements, as well as bypassing the blocking diode to provide the full potential of $V_{DD}$.

BRIEF DESCRIPTION OF THE DRAWINGS

For a better understanding of the present invention, reference may be made to the accompanying drawings, in which:

The FIGURE is a circuit diagram of an embodiment of a $V_{DD}$ reference circuit 10 with a conventional pre-driver and output circuit 12.

DETAILED DESCRIPTION OF THE INVENTION

Referring to the FIGURE, a circuit diagram of an embodiment of a $V_{DD}$ reference circuit 10 with a conventional pre-driver and output circuit 12 is shown. $V_{DD}$ reference circuit includes a blocking diode 16 coupled between a supply voltage, such as $V_{DD}$, and the $V_{DD}$ reference voltage node ($V_{DDREF}$). A p-channel field effect transistor 18 is coupled in parallel with blocking diode 16 with its backgate and drain coupled to the $V_{DD}$ reference voltage, and its gate coupled to the source of a p-channel field effect transistor 28 and the source of an n-channel field effect transistor 22 (node 24). The gate of p-channel field effect transistor 28 is coupled to the supply voltage and its backgate and drain are both coupled to the $V_{DD}$ reference voltage. The gate of n-channel field effect transistor 22 is coupled to the output of an inverter 20, which has its input coupled to the source of an n-channel field effect transistor 32. The drain of n-channel field effect transistor 22 is coupled to the output (node 27) of another inverter 26, the input of which is coupled to the supply voltage.

N-channel field effect transistor 32 is coupled in parallel with a p-channel field effect transistor 34 between node 30 at the input of inverter 20 and an output node 38. The gate terminals of both transistors 32 and 34 are coupled to the supply voltage. The backgate of transistor 34 is coupled to the $V_{DD}$ reference voltage. A p-channel field effect transistor 36 is further coupled between node 24 and output node 38 with its backgate coupled to the $V_{DD}$ reference voltage.

Pre-driver and output circuit 12 is shown with $V_{DD}$ reference circuit 10 of the present invention, so that its operations may be described in detail. Pre-driver and output circuit 12 is a conventional circuit commonly used in combination with $V_{DD}$ reference circuits. Pre-driver and output circuit 12 includes a NAND gate comprised of parallel p-channel field effect transistors 42 and 44 coupled in series with n-channel field effect transistors 48 and 50. The source terminals of transistors 42 and 44 are coupled to the $V_{DD}$ reference voltage node. The gate terminals of transistors 44 and 48 are both coupled to an input node 14, and the gate terminals of transistors 42 and 50 are coupled to node 40. Node 40 is at the output of an inverter 52, which receives a tri-state input 53 at its input. The output from the NAND gate is coupled to the gate terminal of an UOP (upper output) p-channel field effect transistor 46. The source of UOP transistor 46 is coupled to the supply voltage and its drain is coupled to output node 38. The backgate of UOP transistor 46 is coupled to the $V_{DD}$ reference voltage node.

Pre-driver and output circuit 12 further includes a NOR gate comprised of series p-channel field effect transistors 54 and 56 coupled to parallel n-channel field effect transistors 58 and 60. The gate terminals of p-channel field effect transistor 54 and n-channel field effect transistor 60 are coupled to tri-state input node 53, and the gate terminals of p-channel field effect transistor 56 and n-channel field effect transistor 58 are coupled to input node 14. The output of the NOR gate is coupled to the gate of an LOP (lower output) n-channel field effect transistor 62. A ballast or resistive element 64 is coupled between the drain of UOP transistor 46 and the drain of LOP transistor 62. This resistive element 64 is used to protect the LOP (transistor 62) from a electrostatic discharge (ESD).

In operation, $V_{DD}$ reference circuit of the present invention reduces $I_{off}$, satisfies overvoltage tolerance specifications, and bypasses the blocking diode.

$I_{off}$ is the maximum leakage current into or out of the input and output transistors when the input or output is forced to a given DC voltage, such as 5 V, when the $V_{DD}$ voltage level is zero. For example, the $I_{off}$ condition may occur when a circuit card is inserted into an already powered up backplane or if a card is powered down. When $V_{DD}$ voltage is zero, n-channel field effect transistor 32 is in the "OFF" condition, and p-channel field effect transistors 34 and 36 are in the "ON" condition. With transistor 34 "ON", output node 38 is shorted to node 30. With transistor 36 "ON", output node 38 is also shorted to node 24. When a given DC voltage is applied to output node 38, node 30 is forced "HIGH." This "HIGH" voltage level is inverted by inverter 20, and shows up as a "LOW" voltage level at the gate of n-channel field effect transistor 22. n-channel field effect transistor 22 is therefore "OFF." With node 24 "HIGH," p-channel field effect transistor 18 is in the "OFF" condition. P-channel field effect transistor 28 is in the "ON" condition because of the "LOW" voltage level at its gate terminal. In this manner, the voltage level at node 24 is transmitted to the $V_{DD}$ reference voltage node. Therefore, the $V_{DD}$ reference voltage tracks the given DC voltage applied to output node 38. The "HIGH" signal applied at output node 38 is thus supplied to the gate of p-channel UOP transistor 46 and to the backgate thereof through p-channel transistor 44 to ensure that it is in the "OFF" condition. In this manner, $I_{off}$ current through UOP transistor 46 is substantially reduced.

The overvoltage condition occurs when the voltage level on the disabled output node is pulled a threshold voltage ($V_{DD}$) above $V_{DD}$. When this happens, p-channel field effect transistors 34 and 36 are in the "ON" condition. P-channel field effect transistor 34 thus shorts node 30 with the "HIGH" output node voltage. With node 30 "HIGH," the voltage level at the gate of n-channel field effect transistor 22 is "LOW," thus turning it off. Control of node 24 is therefore given to output node 38 via p-channel field effect transistor 36, which is "ON". The "HIGH" voltage level at output node 38 ensures that p-channel field effect transistor 18 is in the "OFF" condition so that the risk of current sink to the $V_{DD}$ reference node through transistor 18 is eliminated. Further, with the voltage level at output node 38 at $V_{DD}+V_t$, p-channel field effect transistor 28 is in the "ON" condition and the voltage level at the $V_{DD}$ reference node will therefore track the voltage at output node 38. Both p-channel field effect transistors 28 and 36 supply the output node voltage to the backgate of UOP transistor 46 and clamp the backgate-drain thereof. P-channel field effect transistors 28 and 36 also supply the output node voltage level to the backgate and source terminals of p-channel field effect transistors 42 and 44, which help to clamp the gate-drain of UOP transistor 46 before it can turn on and sink current into the $V_{DD}$ reference voltage node.

During normal circuit operations, blocking diode 16 is bypassed to supply a stable $V_{DD}$ reference voltage at the backgate of UOP transistor 46 and the backgates and sources of pre-driver p-channel field effect transistors 42 and 44. The advantage is increased circuit speed because the $V_{DD}$ reference voltage is not decreased by the voltage drop across block diode 16. Under normal operations, transistors 34, 36 and 28 are in the "OFF" condition. Inverter 26 applies a "LOW" voltage level to the gate of p-channel field effect transistor 18 through n-channel field effect transistor 22. Thus, $V_{DD}$ is supplied to the $V_{DD}$ reference voltage node through p-channel field effect transistor 18 and bypassing current blocking diode 16.

The present invention provides a $V_{DD}$ reference circuit that satisfies $I_{off}$ and overvoltage operating requirements and further bypasses the current blocking diode to supply the full potential of $V_{DD}$ to the $V_{DD}$ reference voltage node. The speed of the circuit devices are therefore improved.

Modifications to the circuit provided herein are possible without departing from the scope of the present invention. For example, the use of n-channel and p-channel field effect devices may be interchanged provided that the gate voltages are accordingly modified. Other circuit components or transistor technologies may be used according to circuit applications. The presentation of the specific embodiment shown in the FIGURE is solely for the purpose of teaching important technical advantages of the present invention and should not be construed to limit the scope of the present invention.

Although several embodiments of the present, invention and its advantages have been described in detail, it should be understood that mutations, changes, substitutions, transformations, modifications, variations, and alterations can be made therein without departing from the teachings of the present invention, the spirit and scope of the invention being set forth by the appended claims.

What is claimed is:

1. A method of providing a supply reference voltage, comprising:

turning off an output transistor in response to sensing a non-zero voltage level at an output node and a zero supply voltage level;

connecting the supply reference voltage to the voltage at the output node coupled to the output transistor in response to sensing the voltage at the output node being a threshold voltage above the supply voltage level; and providing a path from a supply voltage to the supply reference voltage and thereby bypassing a current blocking diode coupled between the supply voltage and the supply reference voltage.

2. The method, as set forth in claim 1, wherein turning off the output transistor comprises supplying the non-zero voltage level at the output node to the supply reference voltage, the output transistor being in an OFF state when the supply reference voltage coupled to its gate is high.

3. The method, as set forth in claim 1, wherein connecting the supply reference voltage to the voltage at an output node comprises:

turning on a first p-channel transistor coupled between a first control node and the output node in response to sensing the supply voltage coupled to its gate being zero; and turning on a second p-channel transistor coupled between the first control node and the supply reference voltage in response to sending the supply voltage coupled to its gate being zero.

4. The method, as set forth in claim 1, wherein providing a path from a supply voltage to the supply reference voltage comprises turning on a p-channel transistor coupled between the supply voltage and the supply reference voltage in response to sensing a high at the supply voltage.

5. The method, as set forth in claim 1, comprising:

controlling a first p-channel transistor coupled between a first control node and the output node with the voltage level of the supply voltage node coupled to its gate;

controlling a second p-channel transistor coupled between the first control node and the supply reference voltage node with the voltage level of the supply voltage coupled to its gate;

controlling a third p-channel transistor coupled between a second control node and the output node with the voltage level of the supply voltage node coupled to its gate;

controlling a first n-channel transistor operable to pass an inverse of the supply voltage with the voltage level at its gate coupled an inverse of the ouput voltage;

controlling a bypass p-channel transistor coupled between the supply voltage node and the supply reference voltage node with the voltage level at the first control node coupled to its gate; and controlling a second n-channel transistor coupled between the second control node and the output node with the voltage level of the supply voltage node coupled to its gate.

* * * * *